United States Patent [19]
Poulos

[11] 3,767,377
[45] Oct. 23, 1973

[54] METHOD OF INCREASING THE RECOVERABLE SUGAR FROM SUGAR CANE

[75] Inventor: Panos L. Poulos, Winnetka, Ill.

[73] Assignee: Velsicol Chemical Corporation, Chicago, Ill.

[22] Filed: Nov. 2, 1970

[21] Appl. No.: 86,329

[52] U.S. Cl. .................... 71/107
[51] Int. Cl. .................... A01n 9/24
[58] Field of Search .................... 71/107

[56] References Cited

UNITED STATES PATENTS 3,619,169 11/1971 Zick .................... 71/107
3,619,166 11/1971 Quebedeaux, Jr. .................... 71/86

OTHER PUBLICATIONS

Nickell et al., Haw. Sugar Technol. 24th Conf. Nov. 1965, pp. 152–163.

*Primary Examiner*—James O. Thomas, Jr.
*Attorney*—Robert J. Schwarz

[57] ABSTRACT

This invention discloses a method of increasing the recoverable sugar from sugar cane which comprises contacting the cane with an effective amount of an alkyl ester of 2-methoxy-3,6-dichlorobenzoic acid.

7 Claims, No Drawings

METHOD OF INCREASING THE RECOVERABLE SUGAR FROM SUGAR CANE

This invention relates to a method of increasing the yield of sugar from sugar cane. More particularly, this invention relates to a method of increasing the recoverable sugar in sugar cane by treating the sugar cane during its maturation with alkyl esters of dicamba.

A variety of plant growth stimulants and promoters have been tried in the past in attempts to increase the yields of crops. These attempts have met with varying success but have generally not attained commercial significance. One particular crop which has been under investigation with the purpose of increasing yields in sugar cane. However, only insignificant results have been obtained even with such well-known plant stimulants as the gibberellins.

Surprisingly it has now been found that the recovery of sugar from sugar cane can be substantially increased through the use of alkyl esters of 2-methoxy-3,6-dichlorobenzoic acid. Thus, one embodiment of the present invention resides in a method of increasing the recoverable sugar from sugar cane which comprises contacting said sugar cane with an effective amount of alkyl ester of 2-methoxy-3,6-dichlorobenzoic acid at least 2 weeks before harvest. In a preferred embodiment of the present invention the alkyl ester group of 2-methoxy-3,6-dichlorobenzoic acid has from one to 10 carbon atoms.

The alkyl esters of 2-methoxy-3,6-dichlorobenzoic acid are well-known in the art and their preparation is fully described in U.S. Pat. No. 3,013,054.

Examples of these esters are:

methyl 2-methoxy-3,6-dichlorobenzoate
ethyl 2-methoxy-3,6-dichlorobenzoate
propyl 2-methoxy-3,6-dichlorobenzoate
isopropyl 2-methoxy-3,6-dichlorobenzoate
butyl 2-methoxy-3,6-dichlorobenzoate
pentyl 2-methoxy-3,6-dichlorobenzoate
hexyl 2-methoxy-3,6-dichlorobenzoate
heptyl 2-methoxy-3,6-dichlorobenzoate
octyl 2-methoxy-3,6-dichlorobenzoate
nonyl 2-methoxy-3,6-dichlorobenzoate
decyl 2-methoxy-3,6-dichlorobenzoate To effect the method of this invention, sugar cane is treated at a comparatively late stage of development with an effective amount of an active compound described above. This treatment is carried out during that stage of development of the sugar cane wherein sugar formation takes place. Thus, under normal growing conditions and common cultivation practice the active compounds described can be applied to the sugar cane during the period of from about 2 to about 4 weeks before harvesting.

The amount of the active compound of this invention required to effectively increase the recoverable sugar from sugar cane can vary somewhat depending on such factors as the time of application, the weather, crop density, and the like. Generally, an amount of at least about 0.25 pound per acre and preferably an amount of from about 0.5 pound to about 1.5 pounds per acre can be used. While amounts greater than those mentioned can be used, they will not result in an advantage that would warrant their expense and are therefore not practical.

For practical use in treating sugar cane, the compounds of this invention are generally incorporated into compositions or formulations which comprise an inert carrier and an effective amount of such a compound. These compositions enable the active compounds to be conveniently applied to the sugar cane in any desired quantity. These formulations are preferably emulsifiable concentrates although other formulations may be applicable.

The preferred compositions are liquid formulations, particularly emulsifiable concentrates. Emulsifiable concentrates comprise an active compound according to this invention and as the inert carrier, a solvent and an emulsifier. Such emulsifiable concentrates can be extended with water and/or oil to any desired concentration of active compound for application as sprays to the sugar cane. The emulsifiers most commonly used in these concentrates are nonionic or mixtures of nonionic with anionic surface-active agents. With the use of some emulsifier systems an inverted emulsion (water-in-oil) can be prepared.

Typical formulations according to the present invention useful for increasing the recoverable sugar in sugar can are illustrated in the following example:

EXAMPLE

Preparation of an Emulsifiable Concentrates

The following ingredients are blended thoroughly until a homogeneous liquid concentrate is obtained. This concentrate is mixed with water to give an aqueous dispersion containing the desired concentration of the active ingredients for use as a spray.

Methyl 2-methoxy-3,6-dichlorobenzoate — 25 pounds
Sodium lauryl sulfate — 2 -do-
Sodium lignin sulfate — 3 -do-
Kerosene — 70 -do- The effectiveness of the active compounds of this invention for increasing the recoverable sugar in sugar cane was demonstrated by applying an emulsifiable concentrate containing 4 pounds of methyl 2-methoxy 3,6-dichlorobenzoic acid per gallon of solution. The solution was applied to maturing sugar cane at the indicated concentrations 2 to 4 weeks before harvest. Sufficient water was added to insure full coverage of the foliar surface.

In the first experiment one plot of sugar cane was treated at one-half pound per acre of methyl 2-methoxy 3,6-dichlorobenzoic acid; a second plot of sugar cane was treated with 2 pounds per acre and a third plot was not treated. The sugar content was determined at various intervals as follows:

| Concentration Test Compound (lbs/acre) | Percent Sugar Days after Application | | | | | | |
|---|---|---|---|---|---|---|---|
| | 0 | 5 | 12 | 19 | 26 | 32 | 40 |
| ½ | 10.16 | 10.66 | 11.33 | 12.00 | 11.83 | 12.00 | 12.50 |
| 2 | 11.33 | 10.66 | 11.67 | 12.33 | 12.50 | 10.83 | 12.50 |
| 0 | 11.83 | 12.00 | 11.83 | 12.16 | 12.50 | 11.16 | 11.83 |

In another experiment sugar cane plants were again treated with the solution of methyl 2-methoxy 3,6-dichlorobenzoic acid at a different site with the following results:

| Concentration Test Compound (lbs/acre) | Yield of Sugar (mg. of sugar per gram of stalk) Days after Application | | |
|---|---|---|---|
| | 0 | 11 | 33 |
| 0 | 3.62 | 3.17 | 4.84 |
| 2 | 2.93 | 4.50 | 4.30 |
| ½ | 2.78 | 3.42 | 4.44 |

In an additional experiment, sugar cane plants at a third site were treated with a solution of methyl 2-methoxy-3,6-dichlorobenzoic acid. The sugar cane treated with this test compound at a rate of one-half pound per acre resulted in the recovery of 1 ton of sugar from 11.7 tons of treated sugar cane whereas the untreated sugar cane required 12.8 tons of sugar cane from the recovery of 1 ton of sugar.

I claim:

1. A method for increasing the recoverable sugar from sugar cane which comprises contacting the sugar cane with at least about 0.25 pound per acre of an alkyl ester of 2-methoxy-3,6-dichlorobenzoic acid.

2. The method of claim 1 wherein the sugar cane is contacted with an alkyl ester of 2-methoxy-3,6-dichlorobenzoic acid during the period of from about 2 to about 4 weeks before harvest.

3. The method of claim 1 wherein the alkyl ester group of 2-methoxy-3,6-dichlorobenzoic acid has from one to 10 carbon atoms.

4. The method of claim 1 wherein the ester is methyl 2-methoxy-3,6-dichlorobenzoate.

5. The method of claim 1 wherein the ester is decyl 2-methoxy-3,6-dichlorobenzoate.

6. The method of claim 1 wherein the sugar cane is contacted with at least about 0.5 pound per acre of an alkyl ester of 2-methoxy-3,6-dichlorobenzoic acid.

7. The method of claim 1 wherein the sugar cane is contacted with from about 0.5 pound to about 1.5 pounds per acre of methyl 2-methoxy-3,6-dichlorobenzoate.

* * * * *